US010161661B2

(12) United States Patent
Ochiai et al.

(10) Patent No.: US 10,161,661 B2
(45) Date of Patent: Dec. 25, 2018

(54) REFRIGERATION CYCLE APPARATUS, AND ABNORMALITY DETECTION SYSTEM FOR REFRIGERATION CYCLE APPARATUS

(71) Applicant: Mitsubishi Electric Corporation, Tokyo (JP)

(72) Inventors: Yasutaka Ochiai, Tokyo (JP); Masaki Toyoshima, Tokyo (JP); Takashi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 65 days.

(21) Appl. No.: 15/510,709

(22) PCT Filed: Nov. 4, 2014

(86) PCT No.: PCT/JP2014/079188
§ 371 (c)(1),
(2) Date: Mar. 13, 2017

(87) PCT Pub. No.: WO2016/071947
PCT Pub. Date: May 12, 2016

(65) Prior Publication Data
US 2017/0268811 A1    Sep. 21, 2017

(51) Int. Cl.
*F25B 49/02*    (2006.01)
*F24F 11/36*    (2018.01)
(Continued)

(52) U.S. Cl.
CPC .............. *F25B 49/02* (2013.01); *F24F 11/36* (2018.01); *F24F 11/38* (2018.01); *F25B 13/00* (2013.01);
(Continued)

(58) Field of Classification Search
CPC .............. F25B 2500/04; F25B 2500/16; F25B 2500/22; F25B 2500/27; F25B 2500/222;
(Continued)

(56) References Cited

U.S. PATENT DOCUMENTS 3,744,267 A * 7/1973 Norbeck ............... F25B 49/005
340/622
5,347,821 A    9/1994 Oltman et al.
(Continued)

FOREIGN PATENT DOCUMENTS

EP    1 970 651 A1    9/2008
JP    H02-70168 U    5/1990
(Continued)

OTHER PUBLICATIONS

International Search Report of the International Searching Authority dated Jan. 27, 2015 for the corresponding international application No. PCT/JP2014/079188 (and English translation).

*Primary Examiner* — Jonathan Bradford
(74) *Attorney, Agent, or Firm* — Posz Law Group, PLC

(57) ABSTRACT

A refrigeration cycle apparatus includes a refrigeration cycle in which refrigerant circulates, the refrigeration cycle including a compressor, an outdoor heat exchanger, expansion valves, and indoor heat exchangers, which are connected to each other via a refrigerant pipe, a heat source unit accommodating the outdoor heat exchanger, use-side units accommodating the indoor heat exchangers, and a control unit that controls at least turning on and off of the refrigeration cycle. The control unit detects abnormality of the refrigeration cycle based on the pressure or temperature of the refrigeration cycle in an off time of the refrigeration cycle.

13 Claims, 5 Drawing Sheets

(51) Int. Cl.
*F24F 11/38* (2018.01)
*F25B 13/00* (2006.01)
*F25B 49/00* (2006.01)
*F25B 41/06* (2006.01)

(52) U.S. Cl.
CPC .......... *F25B 41/062* (2013.01); *F25B 49/005* (2013.01); *F25B 2313/0233* (2013.01); *F25B 2313/0314* (2013.01); *F25B 2313/0315* (2013.01); *F25B 2400/13* (2013.01); *F25B 2500/04* (2013.01); *F25B 2500/16* (2013.01); *F25B 2500/222* (2013.01); *F25B 2500/27* (2013.01); *F25B 2600/2513* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01)

(58) Field of Classification Search
CPC .. F24F 11/32; F24F 11/36; F24F 11/37; F24F 11/38
See application file for complete search history.

(56) References Cited

U.S. PATENT DOCUMENTS

| | | | |
|---|---|---|---|
| 7,765,817 B2* | 8/2010 | Takegami | F25B 13/00 62/175 |
| 2010/0174412 A1* | 7/2010 | Kwon | F25B 49/005 700/275 |
| 2011/0174059 A1 | 7/2011 | Yonemori et al. | |
| 2011/0308267 A1 | 12/2011 | Tamaki et al. | |

FOREIGN PATENT DOCUMENTS

| | | |
|---|---|---|
| JP | H10-213365 A | 8/1998 |
| JP | H10-238920 A | 9/1998 |
| JP | 2001-208392 A | 8/2001 |
| JP | 2005-241050 A | 9/2005 |
| JP | 2006-275411 A | 10/2006 |
| JP | 4975052 B2 | 4/2012 |
| WO | 2005/068919 A1 | 7/2005 |
| WO | 2008/035418 A1 | 3/2008 |
| WO | 2010/038382 A1 | 4/2010 |

* cited by examiner

REFRIGERATION CYCLE APPARATUS, AND ABNORMALITY DETECTION SYSTEM FOR REFRIGERATION CYCLE APPARATUS

CROSS REFERENCE TO RELATED APPLICATION

This application is a U.S. national stage application of PCT/JP2014/079188 filed on Nov. 4, 2014, the contents of which are incorporated herein by reference.

TECHNICAL FIELD

The present invention relates to a refrigeration cycle apparatus, and an abnormality detection system for the refrigeration cycle apparatus.

BACKGROUND ART

Patent Literature 1 discloses a refrigeration cycle apparatus, for example an air-conditioning apparatus. The refrigeration cycle apparatus is configured so as to obtain a refrigerant amount in each of components constituting a refrigerant circuit on the basis of the quantity of state of operation of the components, to thereby obtain a calculated refrigerant amount which is the total sum of the refrigerant amounts. In addition, it is determined whether the refrigerant amount is appropriate, through comparison between the calculated refrigerant amount and a reference refrigerant amount acquired in advance.

CITATION LIST

Patent Literature

Patent Literature 1: Japanese Patent No. 4975052

SUMMARY OF INVENTION

Technical Problem

With the refrigeration cycle apparatus according to Patent Literature 1, however, since the calculated refrigerant amount is obtained on the basis of the quantity of state of operation of the components in the refrigerant circuit, whether the refrigerant amount is appropriate is unable to be determined in a period during which the operation of the refrigeration cycle apparatus is suspended for a long time, for example in an intermediate season such as spring or autumn.

The present invention has been accomplished in view of the foregoing problem, and provides a refrigeration cycle apparatus configured to detect abnormality even in a period during which the refrigeration cycle is off, and an abnormality detection system for the refrigeration cycle apparatus.

Solution to Problem

In one embodiment, the present invention provides a refrigeration cycle apparatus including a refrigeration cycle in which refrigerant circulates, the refrigeration cycle including a compressor, an outdoor heat exchanger, a depressurizing device and an indoor heat exchanger which are connected to each other via a refrigerant pipe, an outdoor unit accommodating the outdoor heat exchanger, an indoor unit accommodating the indoor heat exchanger, and a control unit that controls at least turning on and off of the refrigeration cycle. The control unit detects abnormality of the refrigeration cycle based on pressure or temperature of the refrigeration cycle in an off time of the refrigeration cycle.

In another embodiment, the present invention provides an abnormality detection system for a refrigeration cycle apparatus, the system including a refrigeration cycle in which refrigerant circulates, the refrigeration cycle including a compressor, an outdoor heat exchanger, a depressurizing device and an indoor heat exchanger which are connected to each other via a refrigerant pipe, an outdoor unit accommodating the outdoor heat exchanger, an indoor unit accommodating the indoor heat exchanger, a control unit that controls at least turning on and off of the refrigeration cycle, and a server connected to the control unit via a communication network. The control unit transmits data of at least pressure or temperature of the refrigeration cycle in an off time of the refrigeration cycle to the server, and the server detects abnormality of the refrigeration cycle based on the pressure or temperature of the refrigeration cycle in the off time of the refrigeration cycle.

Advantageous Effects of Invention

With the refrigeration cycle apparatus configured as above, abnormality of the refrigeration cycle can be detected even in a period during which the refrigeration cycle is off.

DESCRIPTION OF EMBODIMENTS

Embodiment 1

Figure 1:
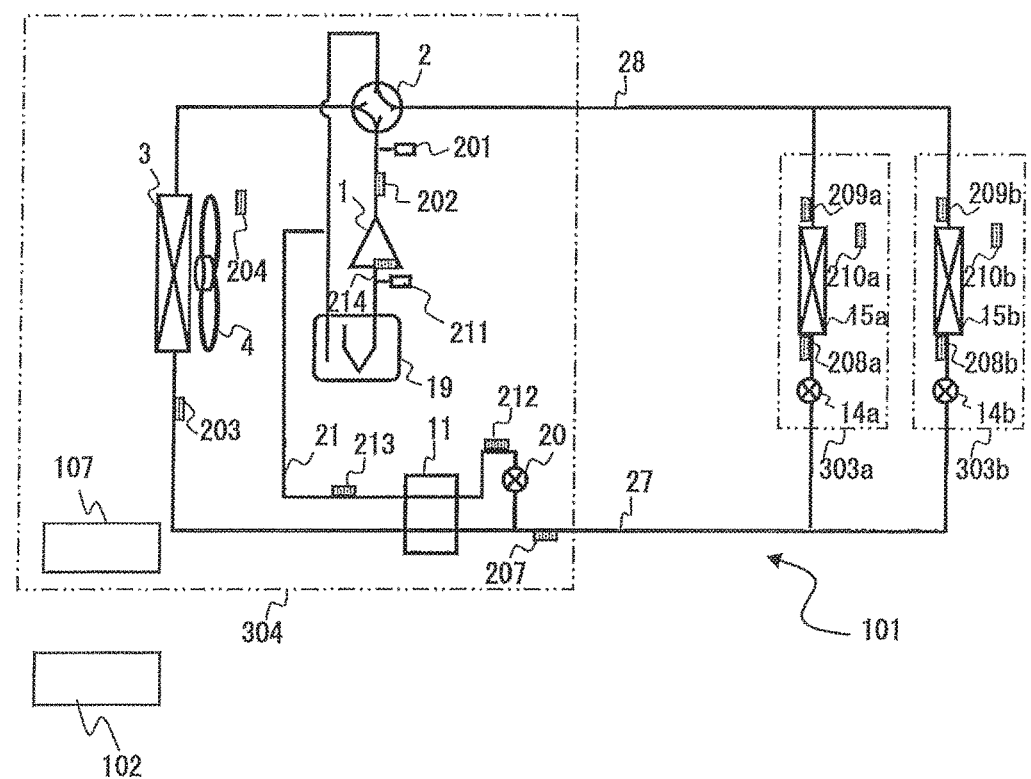
FIG. 1 is a refrigerant circuit diagram showing a general configuration of a refrigeration cycle apparatus according to Embodiment 1 of the present invention.

A refrigeration cycle apparatus, and an abnormality detection system for the refrigeration cycle apparatus according to Embodiment 1 of the present invention will be described hereunder. FIG. 1 is a refrigerant circuit diagram showing a general configuration of a refrigeration cycle apparatus according to Embodiment 1. In Embodiment 1, the refrigeration cycle apparatus is exemplified by an air-conditioning apparatus 101. The air-conditioning apparatus 101 is a VRF (variable refrigerant flow) air-conditioning apparatus that can be installed in a building, a condominium, or a commercial facility. The air-conditioning apparatus 101 is configured to perform a refrigeration cycle operation based on steam compression to circulate air-conditioning refrigerant, to thereby perform a cooling operation or heating operation. The cooling operation and the heating operation are switched therebetween through selection on the side of a use-side unit.

As shown in FIG. 1, the air-conditioning apparatus 101 includes a refrigeration cycle in which the refrigerant circulates. The refrigeration cycle includes a compressor 1, a four-way valve 2, an outdoor heat exchanger 3, at least a pair of expansion valves 14a, 14b (exemplifying the depressurizing device), at least a pair of indoor heat exchangers 15a, 15b, and an accumulator 19, which are connected via a refrigerant pipe so as to form a loop. In the cooling operation, the compressor 1, the outdoor heat exchanger 3, the expansion valve 14a, and the indoor heat exchanger 15a (alternatively, the compressor 1, the outdoor heat exchanger 3, the expansion valve 14b, and the indoor heat exchanger 15b) are connected in the mentioned order in a loop. In the heating operation, the refrigerant flow path is switched by the four-way valve 2, and the compressor 1, the indoor heat exchanger 15a, the expansion valve 14a, and the outdoor heat exchanger 3 (alternatively, the compressor 1, the indoor heat exchanger 15b, the expansion valve 14b, and the outdoor heat exchanger 3) are connected in the mentioned order in a loop.

The air-conditioning apparatus 101 also includes a bypass circuit 21 through which a part of the refrigerant flowing between the outdoor heat exchanger 3 and the expansion valves 14a, 14b is returned to the accumulator 19. The bypass circuit 21 includes a bypass depressurizing mechanism 20 that depressurizes the separated refrigerant flowing into the bypass circuit 21. Further, the air-conditioning apparatus 101 includes a subcooling heat exchanger 11 that cools the refrigerant flowing between the outdoor heat exchanger 3 and the expansion valves 14a, 14b through heat exchange with the refrigerant depressurized in the bypass depressurizing mechanism 20.

The air-conditioning apparatus 101 includes a heat source unit 304 (exemplifying the outdoor unit) installed, for example, at an outdoor location, and a plurality of use-side units 303a, 303b (exemplifying the indoor unit) installed, for example, in an indoor space and connected in parallel to the heat source unit 304. The heat source unit 304 and the use-side units 303a, 303b are connected to each other via a liquid pipe 27 and a gas pipe 28. The liquid pipe 27 and the gas pipe 28 serve as extension pipes connecting between the heat source unit 304 and the use-side units 303a, 303b, and are a part of the refrigerant pipe constituting the refrigeration cycle. Although one heat source unit 304 and two use-side units 303a, 303b are shown in FIG. 1, the air-conditioning apparatus 101 may include two or more heat source units, and just one, or three or more use-side units.

The heat source unit 304 accommodates therein the compressor 1, the four-way valve 2, the outdoor heat exchanger 3, the accumulator 19, the subcooling heat exchanger 11, and the bypass depressurizing mechanism 20. The heat source unit 304 also includes therein an outdoor fan 4 that supplies outside air to the outdoor heat exchanger 3.

The use-side unit 303a accommodates therein the expansion valve 14a and the indoor heat exchanger 15a. The use-side unit 303a also includes therein a non-illustrated indoor fan that supplies air to the indoor heat exchanger 15a. Likewise, the use-side unit 303b accommodates therein the expansion valve 14b, the indoor heat exchanger 15b, and a non-illustrated indoor fan that supplies air to the indoor heat exchanger 15b.

The compressor 1 is a fluid machine that compresses low-pressure refrigerant sucked thereinto, to thereby turn the refrigerant into high-pressure refrigerant and discharge the same. The compressor 1 of Embodiment 1 includes an inverter that controls the rotation speed.

The four-way valve 2 serves to switch the flow direction of the refrigerant, between the cooling operation and the heating operation. The four-way valve 2 includes four ports, namely a first to a fourth ports. The first port is connected to the discharge side of the compressor 1. The second port is connected to the outdoor heat exchanger 3. The third port is connected to the suction side (e.g., accumulator 19) of the compressor 1. The fourth port is connected to the gas pipe 28. In the cooling operation, the four-way valve 2 is switched so as to allow the first port and the second port to communicate with each other, and the third port and the fourth port to communicate with each other (indicated by solid lines in FIG. 1). In the heating operation, the four-way valve 2 is switched so as to allow the first port and the fourth port to communicate with each other, and the second port and the third port to communicate with each other (indicated by broken lines in FIG. 1).

The outdoor heat exchanger 3 acts as condenser in the cooling operation, and as evaporator in the heating operation. The outdoor heat exchanger 3 is configured to exchange heat between the refrigerant flowing therein and the air (outside air) supplied from the outdoor fan 4. The outdoor heat exchanger 3 may be, for example, a cross-fin type fin and tube heat exchanger including a heat transfer pipe and a plurality of fins.

The outdoor fan 4 is configured so as to variably adjust the flow rate of the air to be supplied to the outdoor heat exchanger 3. The outdoor fan 4 may be, for example, a propeller fan driven by a DC fan motor.

The accumulator 19 serves as refrigerant storage for storing a surplus of the refrigerant, and also as gas-liquid separator that detains liquid refrigerant temporarily generated at a transition phase of the operation status, to thereby prevent a large amount of liquid refrigerant from flowing into the compressor 1.

The expansion valves 14a, 14b may be, for example, electronic expansion valves (e.g., linear electronic expansion valve) capable of controlling the opening degree in multiple increments or continuously. Here, the expansion valves 14a, 14b may be substituted with a different depressurizing device, such as a capillary.

The indoor heat exchangers 15a, 15b each act as evaporator in the cooling operation, and as condenser in the heating operation. The indoor heat exchangers 15a, 15b are each configured to exchange heat between the refrigerant flowing therein and the air supplied from the indoor fan. The indoor heat exchangers 15a, 15b may be, for example, a cross-fin type fin and tube heat exchanger including a heat transfer pipe and a plurality of fins.

The air-conditioning apparatus 101 further includes a pressure sensor 201 that detects the pressure of the refrigerant discharged from the compressor 1 (discharge pressure) and a pressure sensor 211 that detects the pressure of the refrigerant sucked into the compressor 1 (suction pressure). The pressure sensors 201, 211 each output a detection signal to a controller 107 to be subsequently described.

Further, the air-conditioning apparatus 101 includes a plurality of temperature sensors that each detect, directly or indirectly through the refrigerant pipe, the temperature of the refrigerant in the refrigeration cycle. More specifically, the heat source unit 304 includes a temperature sensor 202 that detects the temperature of the refrigerant discharged from the compressor 1, a temperature sensor 203 that detects the temperature of the refrigerant on the liquid side of the outdoor heat exchanger 3 (i.e., liquid refrigerant flowing out of the outdoor heat exchanger 3 in the cooling operation, and liquid refrigerant or two-phase refrigerant flowing into the outdoor heat exchanger 3 in the heating operation), a temperature sensor 207 that detects the temperature of the refrigerant between a high-pressure side flow path of the subcooling heat exchanger 11 and the liquid pipe 27, a temperature sensor 212 that detects the temperature of the refrigerant between the bypass depressurizing mechanism 20 and a low-pressure side flow path of the subcooling heat exchanger 11, and a temperature sensor 213 that detects the temperature of the refrigerant on the outlet side of the low-pressure side flow path of the subcooling heat exchanger 11. The use-side unit 303a includes temperature sensors 208a, 209a that respectively detect the temperature of the refrigerant on the inlet side and the outlet side of the indoor heat exchanger 15a. Likewise, the use-side unit 303b includes temperature sensors 208b, 209b that respectively detect the temperature of the refrigerant on the inlet side and the outlet side of the indoor heat exchanger 15b.

The heat source unit 304 also includes a temperature sensor 214 that detects the temperature of the bottom portion of the compressor 1, a temperature sensor 204 that detects ambient temperature (e.g., atmospheric temperature) around the heat source unit 304. The use-side unit 303a includes a temperature sensor 210a that detects ambient temperature (e.g., indoor temperature) around the use-side unit 303a. The use-side unit 303b includes a temperature sensor 210b that detects ambient temperature (e.g., indoor temperature) around the use-side unit 303b.

Still further, the air-conditioning apparatus 101 includes a controller 107 (exemplifying the control unit). The controller 107 includes a microcomputer having a CPU, a ROM, a RAM, and an I/O port. The controller 107 may be composed of a heat source unit controller provided in the heat source unit 304, and use-side unit controllers respectively provided in the use-side units 303a, 303b, and configured to make data communication with the heat source unit controller.

The controller 107 controls the operation status of the air-conditioning apparatus 101, at least including turning on and off of the refrigeration cycle, according to the detection signals from the pressure sensors 201, 211, and the temperature sensor 202, 203, 204, 207, 208a, 208b, 209a, 209b, 210a, 210b, 212, 213, and 214. The controller 107 also transmits, at least during an off time of the refrigeration cycle (e.g., constantly during an on time and the off time of the refrigeration cycle), the pressure data and the temperature data acquired through the detection signals from the mentioned sensors, data indicating the on/off state of the refrigeration cycle, and operation data of the air-conditioning apparatus 101 corresponding to a unit time (e.g., one day), to a local controller 102 to be subsequently described. Examples of the data transmitted from the controller 107 to the local controller 102 include data of the pressure and temperature of the refrigerant in the refrigeration cycle, data of the temperature of the bottom portion of the compressor 1 in the refrigeration cycle, data of the ambient temperature around the heat source unit 304, and data of the ambient temperature around the use-side units 303a, 303b.

The operation of the air-conditioning apparatus 101 will now be described hereunder. The controller 107 is configured to control the components provided in the heat source unit 304 and the use-side units 303a, 303b, according to requests from the use-side units 303a, 303b, to thereby perform a cooling operation mode and a heating operation mode.

The cooling operation mode will be described first. In the cooling operation mode, the four-way valve 2 is controlled so as to connect the discharge side of the compressor 1 to the outdoor heat exchanger 3, and to connect the suction side of the compressor 1 to the gas pipe 28.

High-temperature and high-pressure gas refrigerant discharged from the compressor 1 flows into the outdoor heat exchanger 3 through the four-way valve 2. In the cooling operation, the outdoor heat exchanger 3 acts as condenser. In other words, the outdoor heat exchanger 3 exchanges heat between the refrigerant flowing therein and the air (outside air) supplied from the outdoor fan 4, so that the condensation heat of the refrigerant is radiated to the supplied air. Accordingly, the refrigerant which has entered the outdoor heat exchanger 3 is condensed and turns into high-pressure liquid refrigerant. The high-pressure liquid refrigerant is cooled in the subcooling heat exchanger 11 through heat exchange with low-pressure refrigerant. Then a part of the liquid refrigerant flows into the bypass circuit 21, and the rest of the liquid refrigerant flows into the liquid pipe 27.

After passing through the liquid pipe 27, the high-pressure liquid refrigerant is depressurized in the expansion valves 14a, 14b thus turning into low-pressure two-phase refrigerant. After passing through the expansion valves 14a, 14b, the low-pressure two-phase refrigerant flows into the indoor heat exchangers 15a, 15b. In the cooling operation, the indoor heat exchangers 15a, 15b act as evaporator. In other words, the indoor heat exchangers 15a, 15b each exchange heat between the refrigerant flowing therein and the air (indoor air) supplied from the indoor fan, so that the evaporation heat of the refrigerant is removed from the supplied air. Accordingly, the refrigerant which has entered the indoor heat exchangers 15a, 15b is evaporated and turns into low-pressure gas refrigerant or two-phase refrigerant. In addition, the air supplied from the indoor fan is cooled by the heat removal of the refrigerant, thus turning into cool wind.

After passing through the indoor heat exchangers 15a, 15b, the low-pressure gas refrigerant or two-phase refrigerant passes through the gas pipe 28 and the four-way valve 2, and flows into the accumulator 19. The low-pressure gas refrigerant in the accumulator 19 is sucked into the compressor 1 and compressed, thereby turning into high-temperature and high-pressure gas refrigerant. In the cooling operation, the mentioned cycle is repeated.

In the cooling operation, the compressor 1 is controlled so as to match an evaporating temperature with a predetermined value. The evaporating temperature corresponds to the saturation temperature at a suction pressure detected by the pressure sensor 211. The outdoor fan 4 is controlled so as to match a condensing temperature with a predetermined value. The condensing temperature corresponds to the saturation temperature at a discharge pressure detected by the pressure sensor 201. Thus, the compressor 1 and the outdoor fan 4 are configured to control the refrigerant pressure. The bypass depressurizing mechanism 20 is controlled so as to match a bypass superheating degree with a predetermined value. The bypass superheating degree corresponds to a value obtained by subtracting a temperature detected by the temperature sensor 212 from a temperature detected by the temperature sensor 213. The expansion valve 14a is controlled so as to match an indoor superheating degree with a predetermined value. The indoor superheating degree corresponds to a value obtained by subtracting a temperature detected by the temperature sensor 208a from a temperature detected by the temperature sensor 209a. Likewise, the expansion valve 14b is controlled so as to match an indoor superheating degree, obtained by subtracting a temperature detected by the temperature sensor 208b from a temperature detected by the temperature sensor 209b, with a predetermined value.

The heating operation mode will now be described. In the heating operation mode, the four-way valve 2 is controlled so as to connect the discharge side of the compressor 1 to the gas pipe 28, and to connect the suction side of the compressor 1 to the outdoor heat exchanger 3.

High-temperature and high-pressure gas refrigerant discharged from the compressor 1 flows into the indoor heat exchangers 15a, 15b through the four-way valve 2 and the gas pipe 28. In the heating operation, the indoor heat exchangers 15a, 15b act as condenser. In other words, the indoor heat exchangers 15a, 15b exchange heat between the refrigerant flowing therein and the air (indoor air) supplied from the indoor fan, so that the condensation heat of the refrigerant is radiated to the supplied air. Accordingly, the refrigerant which has entered the indoor heat exchangers 15a, 15b is condensed and turns into high-pressure liquid refrigerant. The air supplied from the indoor fan is heated by the heat radiation of the refrigerant, thus turning into hot wind. The high-pressure liquid refrigerant condensed in the indoor heat exchangers 15a, 15b is depressurized in the expansion valves 14a, 14b, respectively, and turns into low-pressure two-phase refrigerant.

After passing through the expansion valves 14a, 14b, the low-pressure two-phase refrigerant flows into the outdoor heat exchanger 3 through the liquid pipe 27 and the subcooling heat exchanger 11. In the heating operation, the outdoor heat exchanger 3 acts as evaporator. In other words, the outdoor heat exchanger 3 exchanges heat between the refrigerant flowing therein and the air (outside air) supplied from the outdoor fan 4, and the evaporation heat of the refrigerant is removed from the supplied air. Accordingly, the refrigerant which has entered the outdoor heat exchanger 3 is evaporated and turns into low-pressure gas refrigerant.

The low-pressure gas refrigerant flows into the accumulator 19 through the four-way valve 2. The low-pressure gas refrigerant in the accumulator 19 is sucked into the compressor 1 to be thereby compressed, and turns into high-temperature and high-pressure gas refrigerant. The mentioned cycle is repeated in the heating operation.

In the heating operation, the compressor 1 is controlled so as to match a condensing temperature with a predetermined value. The outdoor fan 4 is controlled so as to match an evaporating temperature with a predetermined value. The expansion valves 14a, 14b are controlled so as to match an indoor subcooling degree with a predetermined value. The indoor subcooling degree corresponds to a value obtained by subtracting a temperature detected by the temperature sensor 208a or the temperature sensor 208b, from a saturation temperature corresponding to a discharge pressure detected by the pressure sensor 201.

Figure 2:
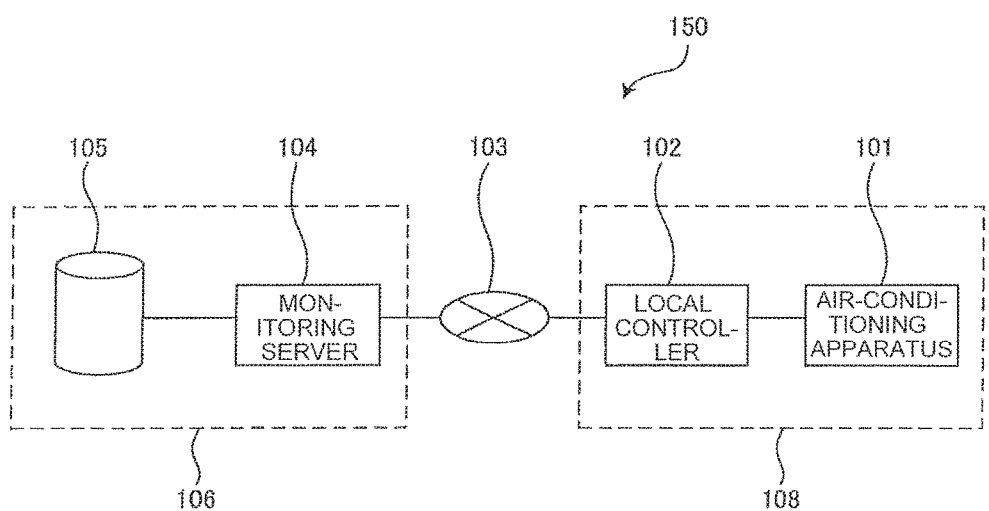
FIG. 2 is a block diagram showing a configuration of an abnormality detection system of the refrigeration cycle apparatus according to Embodiment 1 of the present invention.

FIG. 2 is a block diagram showing a configuration of an abnormality detection system 150 of the refrigeration cycle apparatus according to Embodiment 1. As shown in FIG. 2, the abnormality detection system 150 includes, as components on the client side, at least one air-conditioning apparatus 101, and a local controller 102 (exemplifying the control unit) connected to the controller 107 of the air-conditioning apparatus 101. The controller 107 and the local controller 102 constitute a control unit on the client side in the abnormality detection system 150.

The local controller 102 is installed inside a building 108, together with the air-conditioning apparatus 101. The local controller 102 is connected to one or a plurality of air-conditioning apparatuses 101, directly or via an exclusive adapter. The local controller 102 exchanges data with the controller 107 of the one or the plurality of air-conditioning apparatuses 101, and integrally controls the air-conditioning apparatuses 101. The local controller 102 includes a microcomputer having a CPU, a ROM, a RAM, and an I/O port. In addition, the local controller 102 is connected to a monitoring server 104 to be subsequently described, via an Internet line 103 (exemplifying the communication network), to exchange data with the monitoring server 104. For example, the local controller 102 periodically receives the pressure data, the temperature data, and the data indicating the on/off state of the refrigeration cycle from the controller 107, and transmits the received data to the monitoring server 104.

The abnormality detection system 150 includes, as components on the server side, the monitoring server 104 that detects abnormality in the air-conditioning apparatus 101 (refrigeration cycle) on the basis of the data received from the local controller 102, and a data storage device 105 for accumulating therein the data received from the local controller 102. The monitoring server 104 and the data storage device 105 are located, for example, in a remote management center 106 separated from the building 108.

Figure 3:
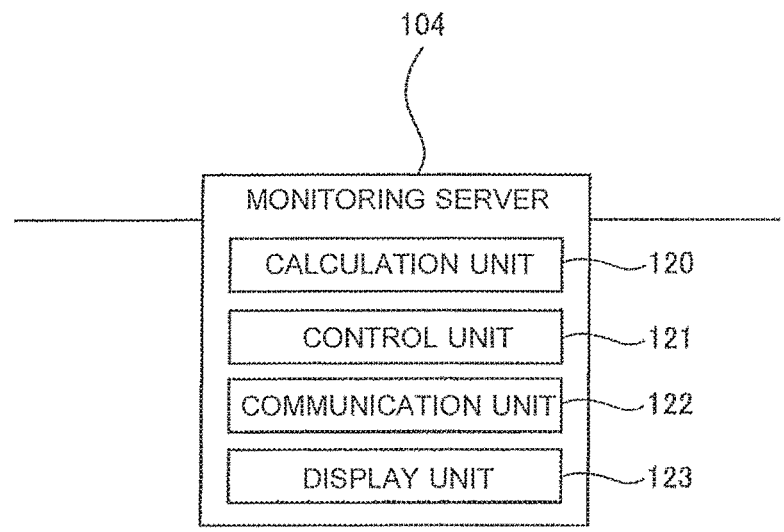
FIG. 3 is a block diagram showing a configuration of a monitoring server of the abnormality detection system of the refrigeration cycle apparatus according to Embodiment 1 of the present invention.

FIG. 3 is a block diagram showing a configuration of the monitoring server 104. As shown in FIG. 3, the monitoring server 104 includes a calculation unit 120, a control unit 121, a communication unit 122, and a display unit 123. The calculation unit 120 performs arithmetic operations such as calculation of an average value of data. The control unit 121 performs control operations, such as instruction of data transmission to the local controller 102, setup of an abnormality detection mode, and determination of abnormality. The communication unit 122 exchanges data with the local controller 102 via the Internet line 103, and also exchanges data with the data storage device 105. The display unit 123 displays an abnormality determination result (presence or absence of abnormality) with respect to the air-conditioning apparatus 101, obtained through the monitoring server 104.

Figure 4:
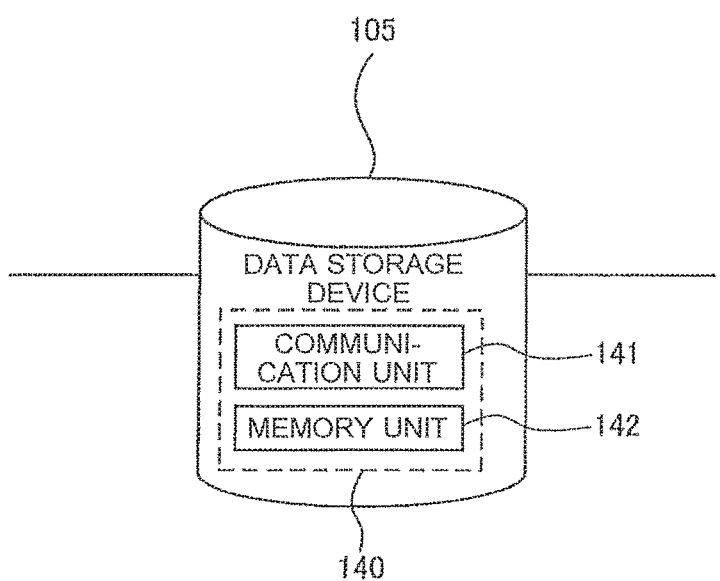
FIG. 4 is a block diagram showing a configuration of a data storage device of the abnormality detection system of the refrigeration cycle apparatus according to Embodiment 1 of the present invention.

FIG. 4 is a block diagram showing a configuration of the data storage device 105. As shown in FIG. 4, the data storage device 105 includes a storage unit 140. The storage unit 140 includes a communication unit 141 that exchanges data with the monitoring server 104 and a memory unit 142 for storing the received data. Upon receipt of a set of data (e.g., data of pressure or temperature of the refrigeration cycle of the air-conditioning apparatus 101, data of ambient temperature around the heat source unit 304, and data of ambient temperature around the use-side units 303a, 303b) from the monitoring server 104, the data storage device 105 associates the set of data with each other, and sequentially stores the set of data in time series in the memory unit 142, as new data.

Although the local controller 102, the monitoring server 104, and the data storage device 105 are provided outside the air-conditioning apparatus 101 in Embodiment 1, the functions of the local controller 102, the monitoring server 104, and the data storage device 105 may be given to the air-conditioning apparatus 101 (e.g., controller 107). In addition, although the data storage device 105 is connected to the Internet line 103 via the monitoring server 104 in Embodiment 1, the data storage device 105 may be directly connected to the Internet line 103.

In an off time (e.g., intermediate period) of the refrigeration cycle, the refrigerant in the refrigeration cycle migrates between the heat source unit 304 (outdoor unit) and the use-side units 303a, 303b (indoor units) while repeating evaporation and condensation. The ambient temperature (e.g., atmospheric temperature) around the heat source unit 304 fluctuates more largely owing to solar radiation and other factors, than the ambient temperature (e.g., indoor temperature) around the use-side units 303a, 303b which are not exposed to air circulation. Accordingly, a temperature difference is generated between the ambient temperature around the heat source unit 304 and the ambient temperature around the use-side units 303a, 303b. The refrigerant in the refrigeration cycle migrates between the heat source unit 304 and the use-side units 303a, 303b, owing to the temperature difference serving as driving force.

More specifically, the ambient temperature around the heat source unit 304 is higher than the ambient temperature around the use-side units 303a, 303b during the daytime. Accordingly, the refrigerant in the heat source unit 304 is evaporated and condensed in the use-side units 303a, 303b. Therefore, the refrigerant in the refrigeration cycle migrates from the heat source unit 304 to the use-side units 303a, 303b during the daytime. During the night time, in contrast, the ambient temperature around the heat source unit 304 becomes lower than the ambient temperature around the use-side units 303a, 303b. Therefore, the refrigerant in the refrigeration cycle migrates from the use-side units 303a, 303b to the heat source unit 304, contrary to the direction in the daytime.

As described above, the refrigerant migrates owing to the temperature difference between the heat source unit 304 and the use-side units 303a, 303b, during the off time of the refrigeration cycle. However, the migration amount of the refrigerant differs between the case where the refrigeration cycle is normally working and the case where abnormality is present in the refrigeration cycle. Therefore, abnormality in the air-conditioning apparatus 101 can be detected by monitoring the pressure or temperature of the refrigerant during the off time of the refrigeration cycle. Examples of the abnormality that can be detected include refrigerant leakage from the refrigeration cycle, clogging of the expansion valves 14a, 14b, clogging of the refrigerant pipe, clogging of the discharge valve of the compressor 1, and shortage of refrigerating machine oil. Hereunder, reasons that such abnormality can be detected will be described with reference to Examples 1 to 5. Although the description given hereunder refers to a period during which the ambient temperature around the heat source unit 304 rises with respect to the ambient temperature around the use-side units 303a, 303b (e.g., from before sun rise to daytime), abnormality can equally be detected also in a period during which the ambient temperature around the heat source unit 304 falls with respect to the ambient temperature around the use-side units 303a, 303b (e.g., from before sun set to night time).

Figure 5:
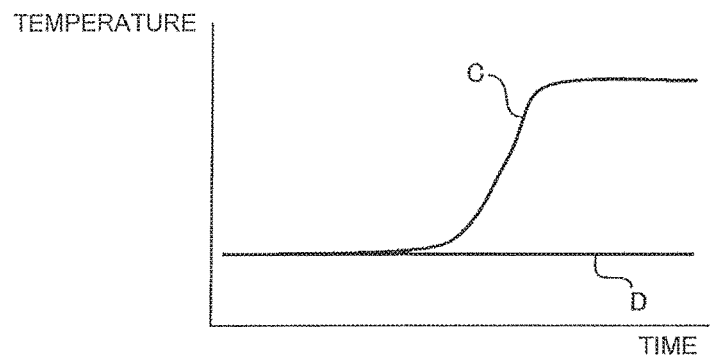
FIG. 5 is a graph showing an example of temporal change of ambient temperature of a heat source unit and ambient temperature of a use-side unit, in the refrigeration cycle apparatus and the abnormality detection system according to Embodiment 1 of the present invention.

FIG. 5 is a graph showing an example of temporal change of the ambient temperature around the heat source unit 304 and the ambient temperature around the use-side units 303a, 303b, the temporal change serving as basis of Examples 1 to 5. The horizontal axis of the graph represents the time (from before sun rise to daytime in these Examples), and the vertical axis represents the temperature. A curve C indicates the temporal change of the ambient temperature around the heat source unit 304, and a curve indicates the temporal change of the ambient temperature around the use-side units 303a, 303b. As shown in FIG. 5, the ambient temperature around the use-side units 303a, 303b barely changes during the period from before the sun rise to the daytime. In contrast, the ambient temperature around the heat source unit 304 is generally the same as the ambient temperature around the use-side unit 303a, 303b before the sun rise, then becomes higher than that in the daytime and is then stabilized at a certain temperature.

EXAMPLE 1

Example 1 represents the case of detecting refrigerant leakage from the refrigeration cycle, on the basis of the temperature of the refrigerant (or refrigerant pipe) in the heat source unit 304 in the off time of the refrigeration cycle. The temperature of the refrigerant in the heat source unit 304 is detected, for example, by one of the temperature sensors 202, 203, and 207.

Figure 6:
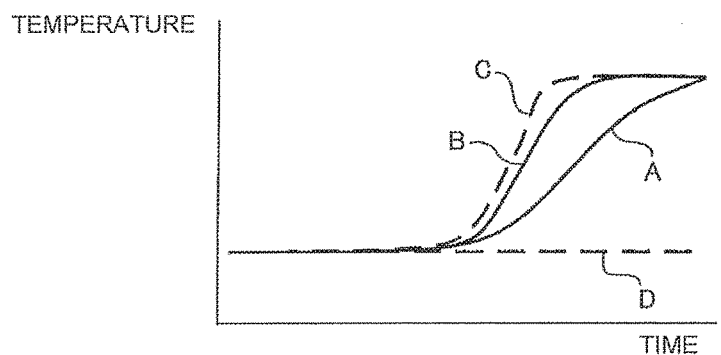
FIG. 6 is a graph showing an example of temporal change of refrigerant temperature in the heat source unit, in the refrigeration cycle apparatus and the abnormality detection system according to Embodiment 1 of the present invention.

FIG. 6 is a graph showing an example of the temporal change of the refrigerant temperature in the heat source unit 304, during the off time of the refrigeration cycle. A curve A indicates the refrigerant temperature in the heat source unit 304 when an appropriate amount of refrigerant is charged in the refrigeration cycle, and a curve B indicates the refrigerant temperature in the heat source unit 304 when the refrigerant charge amount in the refrigeration cycle is insufficient. The curve C and the curve D are the same as those shown in FIG. 5.

When the refrigerant charge amount is appropriate, the liquid refrigerant in the heat source unit 304 is evaporated therein and migrates to the use-side units 303a, 303b. Therefore, the refrigerant temperature in the heat source unit 304 changes more gently as indicated by the curve A in FIG. 6, compared with the change of the ambient temperature around the heat source unit 304 (curve C).

In contrast, when the refrigerant charge amount is insufficient, the amount of the liquid refrigerant in the heat source unit 304 decreases. Therefore, the refrigerant temperature in the heat source unit 304 responsively follows the change of the ambient temperature around the heat source unit 304 closely, as indicated by the curve B in FIG. 6.

As described above, the change in refrigerant temperature in the heat source unit 304 differs depending on whether the refrigerant charge amount is appropriate or insufficient. Therefore, the monitoring server 104 (or controller 107) can detect the refrigerant leakage, on the basis of the refrigerant temperature in the heat source unit 304 acquired during the off time of the refrigeration cycle.

EXAMPLE 2

Example 2 represents the case of detecting refrigerant leakage from the refrigeration cycle on the basis of the pressure or saturation temperature of the refrigerant in the heat source unit 304, acquired during the off time of the refrigeration cycle. The pressure or saturation temperature of the refrigerant in the heat source unit 304 can be detected, for example, by one of the pressure sensors 201 and 211.

Figure 7:
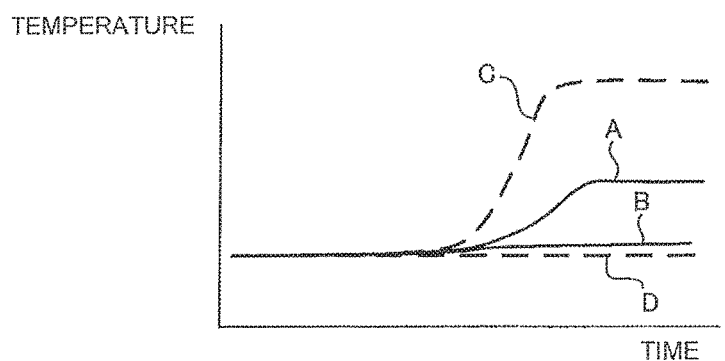
FIG. 7 is a graph showing an example of temporal change of saturation temperature of the refrigerant in the heat source unit, in the refrigeration cycle apparatus and the abnormality detection system according to Embodiment 1 of the present invention.

FIG. 7 is a graph showing an example of the temporal change of the saturation temperature of the refrigerant in the heat source unit 304, during the off time of the refrigeration cycle. The curve A indicates the saturation temperature of the refrigerant in the heat source unit 304 when the refrigerant charge amount in the refrigeration cycle is appropriate, and the curve B indicates the saturation temperature of the refrigerant in the heat source unit 304 when the refrigerant charge amount in the refrigeration cycle is insufficient. The curve C and the curve D are the same as those shown in FIG. 5.

When the refrigerant charge amount is appropriate, the saturation temperature (pressure) of the refrigerant in the heat source unit 304 rises with the rise of the ambient temperature around the heat source unit 304 (curve C), as indicated by the curve A in FIG. 7. However, the saturation temperature of the refrigerant in the heat source unit 304 does not reach the ambient temperature around the heat source unit 304 yet remains in a range between the ambient temperature around the heat source unit 304 and the ambient temperature around the use-side units 303a, 303b.

In contrast, when the refrigerant charge amount is insufficient, the amount of the liquid refrigerant in the heat source unit 304 decreases. Therefore, as indicated by the curve B in FIG. 7, the saturation temperature of the refrigerant in the heat source unit 304 barely rises despite the rise of the ambient temperature around the heat source unit 304.

Thus, the change in saturation temperature of the refrigerant in the heat source unit 304 differs depending on whether the refrigerant charge amount is appropriate or insufficient. Therefore, the monitoring server 104 (or controller 107) can detect the refrigerant leakage, on the basis of the saturation temperature or pressure of the refrigerant in the heat source unit 304 acquired during the off time of the refrigeration cycle.

EXAMPLE 3

Example 3 represents the case of detecting dogging of the expansion valve 14a (electronic expansion valve), on the basis of the temperature of the refrigerant in the use-side unit 303a acquired during the off time of the refrigeration cycle. The refrigerant temperature in the use-side unit 303a can be detected, for example, by one of the temperature sensors 208a and 209a. Here, it will be assumed that the expansion valves 14a, 14b are controlled by the controller 107 so as to be fully opened, when the refrigeration cycle is turned off.

Figure 8:
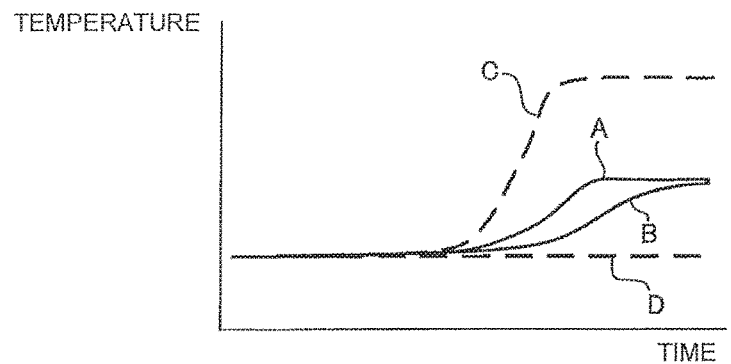
FIG. 8 is a graph showing an example of temporal change of refrigerant temperature in the use-side unit, in the refrigeration cycle apparatus and the abnormality detection system according to Embodiment 1 of the present invention.

FIG. 8 is a graph showing an example of the temporal change of the refrigerant temperature in the use-side unit 303a during the off time of the refrigeration cycle. The curve A indicates the refrigerant temperature in the use-side unit 303a when the expansion valve 14a is normal (fully opened while the refrigeration cycle is off), and the curve B indicates the refrigerant temperature in the use-side unit 303a when the expansion valve 14a is clogged (e.g., locked to close), in other words not fully opened when the refrigeration cycle is off. The curve C and the curve D are the same as those shown in FIG. 5.

When the expansion valve 14a is normal, the internal pressure in the refrigeration cycle increases with the rise of the ambient temperature around the heat source unit 304 (curve C), and accordingly the refrigerant temperature in the use-side unit 303a also rises as indicated by the curve A in FIG. 8.

In contrast, when the expansion valve 14a is clogged the flow of the refrigerant in the expansion valve 14a is disturbed. Accordingly, the refrigerant temperature in the use-side unit 303a becomes less susceptible to the ambient temperature around the heat source unit 304. Therefore, as indicated by the curve B in FIG. 8, the refrigerant temperature in the use-side unit 303a rises more gently compared with the temperature acquired when the expansion valve 14a is normal.

Thus, the change in refrigerant temperature in the use-side unit 303a differs depending on whether the expansion valve 14a is normal or clogged. Therefore, the monitoring server 104 (or controller 107) can detect the clogging of the expansion valve 14a, on the basis of the refrigerant temperature in the use-side unit 303a acquired during the off time of the refrigeration cycle. Likewise, the monitoring server 104 (or controller 107) can also detect the clogging of the expansion valve 14b, on the basis of the refrigerant temperature in the use-side unit 303b acquired during the off time of the refrigeration cycle.

EXAMPLE 4

Example 4 represents the case of detecting clogging of the discharge valve of the compressor 1, on the basis of the pressure or saturation temperature of the refrigerant in the heat source unit 304, acquired during the off time of the refrigeration cycle. The pressure or saturation temperature of the refrigerant in the heat source unit 304 can be detected, for example, by one of the pressure sensors 201 and 211.

Figure 9:
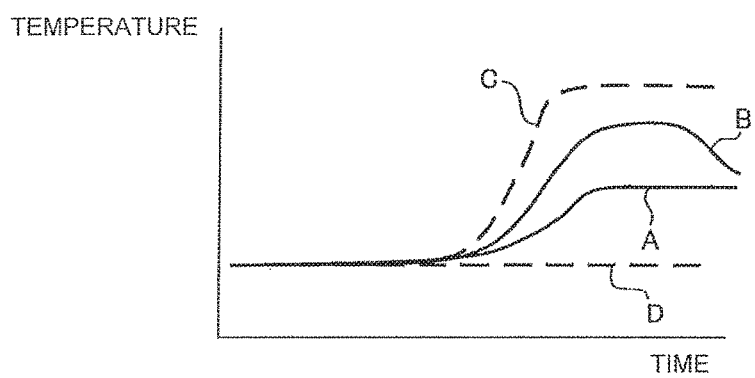
FIG. 9 is a graph showing another example of temporal change of saturation temperature of the refrigerant in the heat source unit, in the refrigeration cycle apparatus and the abnormality detection system according to Embodiment 1 of the present invention.

FIG. 9 is a graph showing an example of the temporal change of the saturation temperature of the refrigerant in the heat source unit 304 during the off time of the refrigeration cycle. The curve A indicates the saturation temperature of the refrigerant in the heat source unit 304 when the discharge valve of the compressor 1 is normal, and the curve B indicates the saturation temperature of the refrigerant in the heat source unit 304 when the discharge valve of the compressor 1 is clogged. The curve C and the curve D are the same as those shown in FIG. 5.

When the discharge valve of the compressor 1 is normal, the saturation temperature (pressure) of the refrigerant in the heat source unit 304 rises with the rise of the ambient temperature around the heat source unit 304 (curve C), as indicated by the curve A in FIG. 9. However, the saturation temperature of the refrigerant in the heat source unit 304 does not reach the ambient temperature around the heat source unit 304 yet remains in a range between the ambient temperature around the heat source unit 304 and the ambient temperature around the use-side units 303a, 303b.

In contrast, when the discharge valve of the compressor 1 is clogged the flow of the refrigerant in the discharge valve of the compressor 1 is disturbed. Accordingly, the saturation temperature of the refrigerant in the heat source unit 304 becomes less susceptible to the ambient temperature around the use-side units 303a, 303b. Therefore, the saturation temperature of the refrigerant in the heat source unit 304 changes so as to closely follow the ambient temperature around the heat source unit 304, and finally comes close to a temperature between the ambient temperature around the heat source unit 304 and the ambient temperature around the use-side units 303a, 303b.

Thus, the change in saturation temperature of the refrigerant in the heat source unit 304 differs depending on whether the discharge valve of the compressor 1 is normal or clogged. Therefore, the monitoring server 104 (or controller 107) can detect the clogging of the discharge valve of the compressor 1, on the basis of the temperature of the refrigerant in the heat source unit 304 acquired during the off time of the refrigeration cycle.

EXAMPLE 5

Example 5 represents the case of detecting shortage of the refrigerating machine oil in the compressor 1, on the basis of the temperature of the bottom portion of the compressor 1 acquired during the off time of the refrigeration cycle. The temperature of the bottom portion of the compressor 1 can be detected by the temperature sensor 214.

Figure 10:
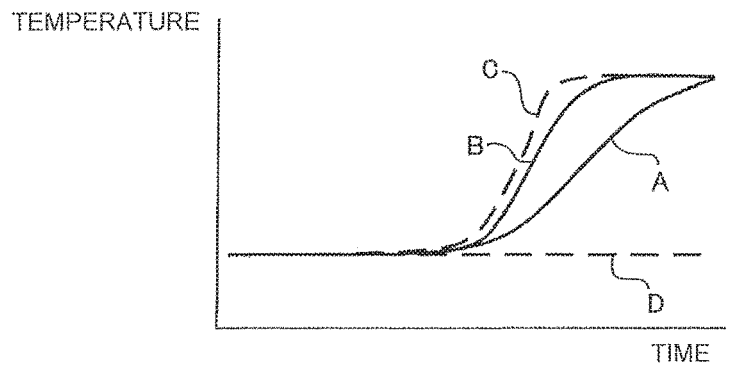
FIG. 10 is a graph showing an example of temporal change of temperature of a bottom portion of a compressor, in the refrigeration cycle apparatus and the abnormality detection system according to Embodiment 1 of the present invention.

FIG. 10 is a graph showing an example of the temporal change of the temperature of the bottom portion of the compressor 1 during the off time of the refrigeration cycle. The curve A indicates the temperature of the bottom portion of the compressor 1 when the amount of the refrigerating machine oil in the compressor 1 is normal, and the curve B indicates the temperature of the bottom portion of the compressor 1 when the amount of the refrigerating machine oil in the compressor 1 is insufficient. The curve C and the curve D are the same as those shown in FIG. 5.

When the amount of the refrigerating machine oil in the compressor 1 is normal, the refrigerating machine oil in the compressor 1 possesses predetermined thermal capacity. Accordingly, as indicated by the curve A in FIG. 10, it takes longer for the temperature of the bottom portion of the compressor 1 to rise (time lag is generated), compared with the rise of the ambient temperature around the heat source unit 304 (curve C).

In contrast, when the amount of the refrigerating machine oil in the compressor 1 is insufficient (e.g., refrigerating machine oil has run out), the thermal capacity of the refrigerating machine oil is reduced, and therefore the temperature of the bottom portion of the compressor 1 closely follows up the rise of the ambient temperature around the heat source unit 304, as indicated by the curve B in FIG. 10.

Thus, the change in temperature of the bottom portion of the compressor 1 differs depending on whether the amount of the refrigerating machine oil in the compressor 1 is normal or insufficient. Therefore, the monitoring server 104 (or controller 107) can detect the shortage of the refrigerating machine oil in the compressor 1, on the basis of the temperature of the bottom portion of the compressor 1 acquired during the off time of the refrigeration cycle.

In Embodiment 1, the monitoring server 104 detects abnormality in the refrigeration cycle on the basis of past data stored in time series in the data storage device 105 (e.g., data of pressure or temperature of the refrigeration cycle, data of ambient temperature around the heat source unit 304, and data of ambient temperature around the use-side units 303a, 303b).

Figure 11:
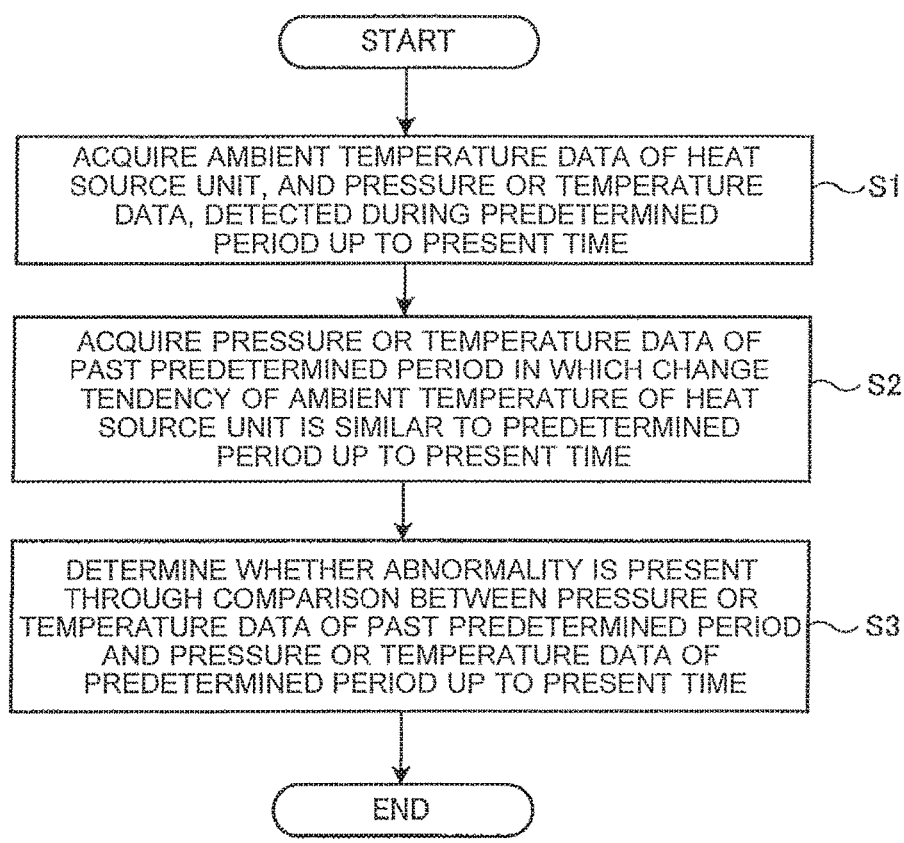
FIG. 11 is a flowchart showing an abnormality detection process performed by the monitoring server for the refrigeration cycle, in the refrigeration cycle apparatus and the abnormality detection system according to Embodiment 1 of the present invention.

FIG. 11 is a flowchart showing an abnormality detection process performed by the monitoring server 104 (or controller 107) for the refrigeration cycle. The process according to FIG. 11 is exemplary and repeatedly performed at predetermined time intervals during the off time of the refrigeration cycle. As shown in FIG. 11, the monitoring server 104 acquires, from the data storage device 105, the data of the ambient temperature around the heat source unit 304 and the data of the pressure or temperature of the refrigeration cycle, detected during a predetermined period (e.g., 24 hours) up to the present time (step S1).

Then the monitoring server 104 extracts, out of the data stored in the data storage device 105, pressure or temperature data of a past predetermined period in which the tendency of change of the ambient temperature of the heat source unit 304 is similar to that of the predetermined period up to present time, and acquires such data (step S2).

The monitoring server 104 then determines whether abnormality is present in the refrigeration cycle, through relative comparison between the pressure or temperature data of the refrigeration cycle of the past predetermined period and the pressure or temperature data of the refrigeration cycle of the predetermined period up to present time (step S3). For example, it is determined that abnormality is present in the refrigeration cycle when the change tendency of the pressure or temperature data of the refrigeration cycle of the predetermined period up to present time is different from that of the past predetermined period. Such an arrangement enables the abnormality in the refrigeration cycle to be more accurately detected, and prevents erroneous detection.

In Example 1 above, for example, the monitoring server 104 acquires, from the data storage device 105, the data of the refrigerant temperature in the heat source unit 304 in a past predetermined period, in which the change tendency of the ambient temperature around the heat source unit 304 is similar to that of the predetermined period up to present time. Then the monitoring server 104 compares between the change of the refrigerant temperature in the heat source unit 304 in the past and the current change of the refrigerant temperature in the heat source unit 304. It will be assumed here, for example, that the past change of the refrigerant temperature in the heat source unit 304 is indicated by the curve A in FIG. 6, and the current change of the refrigerant temperature in the heat source unit 304 is indicated by the curve B in FIG. 6. In this case, it is determined that refrigerant leakage is not taking place when the temperature difference between the curve B and the curve A is smaller than a predetermined value, and it is determined that refrigerant leakage is taking place when the temperature difference between the curve B and the curve A is equal to or larger than the predetermined value.

In addition, for example in Example 2 above, the monitoring server 104 acquires, from the data storage device 105, the data of the saturation temperature of the refrigerant in the heat source unit 304 in a past predetermined period, in which the change tendency of the ambient temperature around the heat source unit 304 is similar to that of the predetermined period up to present time. Then the monitoring server 104 compares between the past change of the saturation temperature of the refrigerant in the heat source unit 304 and the current change of the saturation temperature of the refrigerant in the heat source unit 304. It will be assumed here, for example, that the past change of the saturation temperature of the refrigerant in the heat source unit 304 is indicated by the curve A in FIG. 7, and the current change of the saturation temperature of the refrigerant in the heat source unit 304 is indicated by the curve B in FIG. 7. In this case, it is determined that refrigerant leakage is not taking place when the temperature difference between the curve B and the curve A is smaller than a predetermined value, and it is determined that refrigerant leakage is taking place when the temperature difference between the curve B and the curve A is equal to or larger than the predetermined value.

Here, the monitoring server 104 may utilize the past data of different air-conditioning apparatuses for comparison, in addition to the past data of the same air-conditioning apparatus 101. This is because the pressure and the temperature of different air-conditioning apparatuses also change in similar tendencies during the off time of the refrigeration cycle, provided that the change tendency of the ambient temperature around the heat source unit is similar.

Further, the monitoring server 104 may compare between the current pressure or temperature in the off time of the refrigeration cycle and the ambient temperature around the heat source unit 304 or the ambient temperature around the use-side units 303a, 303b in the same period, to thereby detect abnormality in the refrigeration cycle.

In Example 1 above, for example, the monitoring server 104 monitors, at least during the off time of the refrigeration cycle, the change of the ambient temperature around the heat source unit 304 and the change of the refrigerant temperature in the heat source unit 304. The monitoring server 104 may detect refrigerant leakage according to whether the refrigerant temperature in the heat source unit 304 changes so as to follow the change of the ambient temperature around the heat source unit 304, when the refrigerant temperature in the heat source unit 304 changes to a predetermined extent. Whether the refrigerant temperature in the heat source unit 304 changes so as to follow the change of the ambient temperature around the heat source unit 304 can be determined, for example, according to whether the temperature difference between the refrigerant temperature in the heat source unit 304 and the ambient temperature around the heat source unit 304 is within a predetermined value (e.g., 1K).

As described thus far, the refrigeration cycle apparatus 101 according to Embodiment 1 includes the refrigeration cycle in which the refrigerant circulates, the refrigeration cycle including the compressor 1, the outdoor heat exchanger 3, the expansion valves 14a, 14b, and the indoor heat exchangers 15a, 15b, which are connected to each other via the refrigerant pipe, the heat source unit 304 accommodating the outdoor heat exchanger 3, the use-side units 303a, 303b accommodating the indoor heat exchangers 15a, 15b, and the control unit 107 that controls at least turning on and off of the refrigeration cycle. The control unit 107 detects abnormality of the refrigeration cycle based on the pressure or temperature of the refrigeration cycle in the off time of the refrigeration cycle.

In addition, the abnormality detection system 150 for the refrigeration cycle apparatus according to Embodiment 1 includes the refrigeration cycle in which the refrigerant circulates, the refrigeration cycle including the compressor 1, the outdoor heat exchanger 3, the expansion valves 14a, 14b, and the indoor heat exchangers 15a, 15b, which are connected to each other via the refrigerant pipe, the heat source unit 304 accommodating the outdoor heat exchanger 3, the use-side units 303a, 303b accommodating the indoor heat exchangers 15a, 15b, the control unit (e.g., controller 107, local controller 102) that controls at least turning on and off of the refrigeration cycle, and the monitoring server 104 connected to the control unit via the Internet line 103. The control unit transmits data of at least the pressure or temperature of the refrigeration cycle in the off time of the refrigeration cycle to the monitoring server 104, and the monitoring server 104 detects abnormality of the refrigeration cycle based on the pressure or temperature of the refrigeration cycle in the off time of the refrigeration cycle.

The mentioned configurations enable the abnormality in the refrigeration cycle to be detected despite the refrigeration cycle being off. In addition, the foregoing configurations eliminate the need to activate the refrigeration cycle for the purpose of abnormality detection in the off time of the refrigeration cycle, thereby contributing to reduction in energy consumption.

Further, since the configurations according to Embodiment 1 enable the refrigerant leakage to be detected despite the refrigeration cycle being off, the product safety and environmental integrity can be improved, and the environmental load can be reduced.

Other Embodiments

The present invention may be modified in various manners without limitation to Embodiment 1.

For example, although the communication network is exemplified by the Internet line 103 in Embodiment 1, a LAN or a WAN may be employed as communication network.

In addition, although the refrigeration cycle apparatus is exemplified by the air-conditioning apparatus 101 in Embodiment 1, the present invention is also applicable to different types of refrigeration cycle apparatuses, such as a hot water supplier, a freezer, a refrigerator, and an automatic vending machine.

REFERENCE SIGNS LIST

1: compressor, 2: four-way valve, 3: outdoor heat exchanger, 4: outdoor fan, 11: subcooling heat exchanger, 14a, 14b: expansion valve, 15a, 15b: indoor heat exchanger, 19: accumulator, 20: bypass depressurizing mechanism, 21: bypass circuit, 27: liquid pipe, 28: gas pipe, 101: air-conditioning apparatus, 102: local controller, 103: Internet line, 104: monitoring server, 105: data storage device, 106: remote management center, 107: controller, 108: building, 120: calculation unit, 121: control unit, 122: communication unit, 123: display unit, 140: storage unit, 141: communication unit, 142: memory unit, 150: abnormality detection system, 201, 211: pressure sensor, 202, 203, 204, 207, 208a, 208b, 209a, 209b, 210a, 210b, 212, 213, 214: temperature sensor, 303a, 303b: use-side unit, 304: heat source unit

The invention claimed is:

1. A refrigeration cycle apparatus comprising:
a compressor, an outdoor heat exchanger, a depressurizing device and an indoor heat exchanger connected in a refrigeration cycle in which refrigerant circulates via a refrigerant pipe;
an outdoor unit that accommodates the outdoor heat exchanger;
an indoor unit that accommodates the indoor heat exchanger; and
a controller configured to control at least turning on and off of the refrigeration cycle,
the controller being configured to detect an abnormality of the refrigeration cycle based on (i) pressure of the refrigeration cycle acquired when the refrigeration cycle is off or (ii) temperature of the refrigeration cycle acquired when the refrigeration cycle is off, and an ambient temperature around the outdoor unit with respect to an ambient temperature around the indoor unit;
wherein the controller is further configured to detect the abnormality through comparison between the acquired temperature or the acquired pressure and the ambient temperature around the outdoor unit or the ambient temperature around the indoor unit, the acquired pressure of the refrigeration cycle and the acquired temperature of the refrigeration cycle, and the ambient temperature around the outdoor unit and the ambient temperature around the indoor unit being acquired when the refrigeration cycle is off and the ambient temperature around the outdoor unit increases or decreases with respect to the ambient temperature around the indoor unit.

2. The refrigeration cycle apparatus of claim 1,
wherein the abnormality which is detected includes a refrigerant leakage from the refrigeration cycle, and
the controller is configured to detect the refrigerant leakage based on the acquired temperature, wherein the acquired temperature is a refrigerant temperature in the outdoor unit acquired when the refrigeration cycle is off and the ambient temperature around the outdoor unit increases or decreases with respect to the ambient temperature around the indoor unit.

3. The refrigeration cycle apparatus of claim 1,
wherein the abnormality which is detected includes a refrigerant leakage from the refrigeration cycle, and
the controller is configured to detect the refrigerant leakage based on the acquired pressure, wherein the acquired pressure is a pressure or a saturation temperature of the refrigerant in the outdoor unit acquired when the refrigeration cycle is off.

4. The refrigeration cycle apparatus of claim 1,
wherein the depressurizing device includes an electronic expansion valve controlled by the controller,
the abnormality which is detected includes a clogging of the electronic expansion valve,
the controller is configured to control the electronic expansion valve so as to be fully opened while the refrigeration cycle is off, and
the controller is configured to detect the clogging of the electronic expansion valve based on the acquired temperature, wherein the acquired temperature is a refrigerant temperature in the indoor unit acquired when the refrigeration cycle is off and the ambient temperature around the outdoor unit increases or decreases with respect to the ambient temperature around the indoor unit.

5. The refrigeration cycle apparatus of claim 1,
wherein the abnormality which is detected includes a clogging of a discharge valve of the compressor, and
the controller is configured to detect the clogging of the discharge valve based on the acquired pressure, wherein the acquired pressure is a pressure or a saturation temperature of the refrigerant in the outdoor unit acquired when the refrigeration cycle is off and the ambient temperature around the outdoor unit increases or decreases with respect to the ambient temperature around the indoor unit.

6. The refrigeration cycle apparatus of claim 1,
wherein the abnormality which is detected includes a shortage of refrigerating machine oil in the compressor, and
the controller is configured to detect the shortage of the refrigerating machine oil based on the acquired temperature, wherein the acquired temperature is a temperature of a bottom portion of the compressor acquired when the refrigeration cycle is off and the ambient temperature around the outdoor unit increases or decreases with respect to the ambient temperature around the indoor unit.

7. The refrigeration cycle apparatus of claim 1,
wherein the controller is configured to detect a refrigerant leakage from the refrigeration cycle based on a determination of whether a temperature difference between the acquired temperature, which is a refrigerant temperature in the outdoor unit, and the ambient temperature around the outdoor unit is within a predetermined range.

8. The refrigeration cycle apparatus of claim 1,
wherein the controller is configured to
store data of at least the acquired pressure of the refrigeration cycle or the acquired temperature of the refrigeration cycle in an off period of the refrigeration cycle and store data of the ambient temperature around the outdoor unit, and
detect the abnormality in the refrigeration cycle through comparison between a stored pressure or a stored temperature of the refrigeration cycle stored in a past off period and a the acquired pressure or the acquired temperature of the refrigeration cycle at present.

9. The refrigeration cycle apparatus of claim 8,
wherein the controller is configured to
acquire data of the stored pressure of the refrigeration cycle or the stored temperature of the refrigeration cycle of the past off period in which the ambient temperature around the outdoor unit is similar to change tendency of the ambient temperature around the outdoor unit at present, and
detect the abnormality in the refrigeration cycle through comparison between the stored pressure or the stored temperature of the refrigeration cycle of the past off period and the acquired pressure or the acquired temperature of the refrigeration cycle at present.

10. An abnormality detection system for a refrigeration cycle apparatus, the system comprising:
a compressor, an outdoor heat exchanger, a depressurizing device and an indoor heat exchanger connected in a refrigeration cycle in which refrigerant circulates via a refrigerant pipe;
an outdoor unit that accommodates the outdoor heat exchanger;
an indoor unit that accommodates the indoor heat exchanger;
a controller configured to control at least turning on and off of the refrigeration cycle; and
a server connected to the controller via a communication network,
the controller being configured to transmit data of at least a pressure or a temperature of the refrigeration cycle in an off period of the refrigeration cycle to the server, and
the server being configured to detect an abnormality of the refrigeration cycle based on (i)the pressure of the refrigeration cycle acquired when the refrigeration cycle is off or (ii) the temperature acquired when the refrigeration cycle is off, and an ambient temperature around the outdoor unit with respect to an ambient temperature around the indoor unit,
wherein the server is further configured to detect the abnormality through comparison between the acquired temperature or the acquired pressure and the ambient temperature around the outdoor unit or the ambient temperature around the indoor unit,
the acquired pressure of the refrigeration cycle and the acquired temperature of the refrigeration cycle, and the ambient temperature around the outdoor unit and the ambient temperature around the indoor unit being acquired when the refrigeration cycle is off and the ambient temperature around the outdoor unit increases or decreases with respect to the ambient temperature around the indoor unit.

11. The abnormality detection system for a refrigeration cycle apparatus of claim 10, further comprising a data storage connected to the controller via a communication network and configured to store the data of at least the acquired pressure or the acquired temperature of the refrigeration cycle in the off period of the refrigeration cycle, and data of an ambient temperature around the outdoor unit, wherein the server is configured to acquire, from the data storage, data of a stored pressure or a stored temperature of the refrigeration cycle of a past period in which the ambient temperature around the outdoor unit is similar to change tendency of the ambient temperature around the outdoor unit at present, and detect the abnormality through comparison between the stored pressure or the stored temperature of the refrigeration cycle of the past period and the acquired pressure or the acquired temperature of the refrigeration cycle at present.

12. The abnormality detection system for a refrigeration cycle apparatus of claim 10, wherein the controller is further configured to periodically transmit, to the server, at least while the refrigeration cycle is off, on/off data indicating the on/off state of the refrigeration cycle, pressure data indicating the pressure of the refrigeration cycle while the refrigeration cycle is off or temperature data indicating the temperature of the refrigeration cycle while the refrigeration cycle is off, temperature data of the ambient temperature around the outdoor unit, and temperature data of the ambient temperature around the indoor unit.

13. The abnormality detection system of claim 10, wherein the server is configured to detect a refrigerant leakage from the refrigeration cycle based on a determination of whether a temperature difference between the acquired temperature, which is a refrigerant temperature in the outdoor unit, and the ambient temperature around the outdoor unit is within a predetermined range.

* * * * *